of the stem being enlarged as at 67 to engage the head
66 and thus the force of the spring 63 is transmitted
from the poppet valve stem 56 to the poppet valve
which tends to hold this valve in seated position.

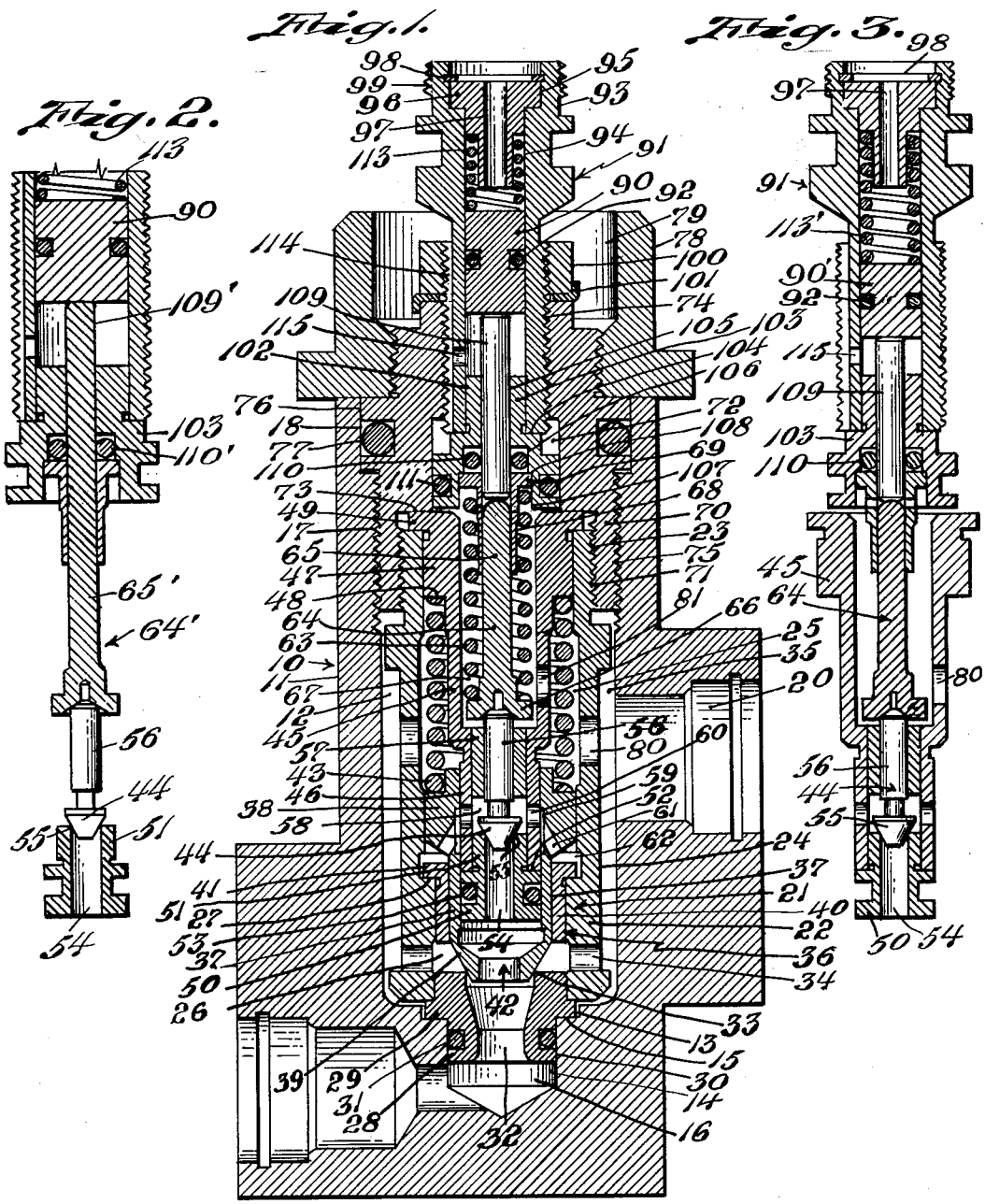

United States Patent Office
2,737,200
Patented Mar. 6, 1956

2,737,200
RELIEF VALVE

Frank C. Lornitzo, Pawtucket, and Clifton N. Lovenberg, Providence, R. I., assignors to Merit Engineering, Inc., a corporation of Rhode Island Application April 23, 1952, Serial No. 283,821

6 Claims. (Cl. 137—490)

This invention relates to improvements in a relief valve.

An object of the invention is to provide a relief valve so constructed that the relief pressure may be controlled by an outside or sensed pressure.

A more specific object of the invention is to provide a relief valve so constructed that relief pressure is controlled by a sensed pressure in a manner so that the relief pressure is increased by adding a multiple of a sensed pressure.

Another object of the invention is to provide a relief valve so constructed as to be balanced to pressure in the downstream side thereof and operable for controlling relief pressure by a sensed pressure.

With these and other objects in view, the invention consists of certain novel features of construction as will be more fully described and particularly pointed out in the appended claims.

In the accompanying drawings:

Figure 1 is a longitudinal sectional view of a relief valve embodying my invention;

Figure 2 is a sectional view of a modified construction of spring guide; and

Figure 3 is a sectional view showing a modified arrangement of loading of the poppet valve.

The relief valve designated generally 10 comprises an envelope or body 11 having a longitudinal bore 12 extending inwardly from the upper end of the body to near the bottom where it joins the reduced bore 13, from which extends the further reduced bore 14 to form a stop shoulder 15 with the bore opening into an inlet or pressure port 16 formed by a lateral bore extending inwardly from one side of the body. A threaded bore 17 at the upper portion of the body and larger than the bore 12 joins the bore 12 and a further enlarged bore 18 is provided above the threaded portion 17. An outlet or return port 20 extends inwardly from one side of the body 11 to open into said bore 12. In this bore 12 there is mounted a valve unit assembly indicated generally 21 which includes a tubular member or sleeve 22 externally threaded at its upper end portion as at 23 and having a reduced waist portion 24. The opening or bore 25 through the sleeve 22 joins a smaller bore 26 at its lower end, forming a radial shoulder or stop 27.

A main valve seat tubular member 28 having an annular flange 29 intermediate its ends is frictionally received in the smaller bore 26 of the sleeve with the flange 29 engaging the lower end of the sleeve 22. The other end portion 30 of the member 28 is received within the bore 14 and the other side of the flange 29 abuts against the stop shoulder 15. An O ring packing 31 which is received in an annular groove in the portion 30 provides a seal between the bore 14 and member 29 to fluid from port 16. The opening 32 through the member 28 at the upper end of member 28 provides a knife-edge valve seat 33. A plurality of radial openings 34 through the waist portion 24 connects the said bore portion 26 to an annular space 35 defined by the waist portion 24 and the wall of the bore 12. Thus there is provided a conduit for the fluid to pass from the pressure port 16 through the opening of valve seat 33 into the space 35 and out to return port 20.

A main valve plug indicated generally 36 controls the passage of fluid through the opening of valve seat 33 and comprises a tubular member having a skirt portion 37 and an enlarged head 38 which is of a diameter to be freely slidable within the bore 26. The lower edge of the skirt 37 is tapered as at 39 to engage and form a tight seal against the seat 33. The main valve plug 36 is additionally guided by means of a sleeve 40 which is frictionally received in the upper part of the reduced bore 26 and is provided with a flange 41 which seats against the shoulder 27. The opening, indicated generally 42, through the main valve forms a conduit to the opening 32 of the member 29. A compression spring 43 bears against the upper side of the head 38 to act thereon in a direction tending to move said main valve to seated position.

A pilot or poppet valve indicated generally 44 controls the opening and closing of the said main valve 36. This valve 44 is mounted in a tubular housing 45 having a reduced skirt portion 46 at the lower end portion thereof and has an enlarged head portion 47 at its upper end providing a shoulder 48 and is further enlarged at the extreme upper end portion thereof to form an annular flange 49. This housing 45 is received within the sleeve 22 with the head portion 47 thereof engaging the wall of the bore 25 and the flange 49 engaging the upper end of the said sleeve 22. The skirt portion 46 extends a substantial distance within the opening 42 through the main valve, the said main valve being freely slidable along said skirt portion 46. The upper end of the spring 43 abuts against the shoulder 48.

A poppet valve seat member 50 having a diameter nearly equal to that of the said skirt portion 46 is received in the opening 42 and has a reduced portion 51 to be received within the bore of the skirt 46 and forms a stop shoulder 52 to engage the adjacent edge of the said skirt 46. This valve seat member 50 is sealed against the walls of opening 42 by an O ring packing 53. The member 50 has a central opening 54 therethrough, the upper edge of which forms a knife-edge valve seat. The poppet valve 44 has a conical end 55 from which extends a valve stem 56 which is slidably mounted in a sleeve bearing or bushing 57 which is frictionally secured to the inner walls of the skirt 46 and with the lower edge of said sleeve being spaced from the member 50 a distance so as to form a chamber 58 defined by the inner walls of the skirt 46 and the ends of the said sleeve and member 50. The conical end 55 is exposed through the opening 54 to fluid from the pressure port 16 acting thereon in a direction tending to move the valve 44 to open position.

The wall of main valve opening 42 inwardly of the edges of the head 38 is grooved so as to provide an annular recess 59 surrounding the skirt 46. This recess 59 is connected to the chamber 58 by means of radial openings 60 through the skirt portion 46 and is connected by means of openings 61 through the head 38 to a chamber 62 defined by the walls of the bore 25, head 38, and upper side of the guide member 40.

The poppet valve 44 is opposed to movement by fluid under pressure from port 16 by means of a compression spring 63 which through a spring guide member 64 exerts a predetermined force on said poppet valve tending to hold the same in the seated or closed position. This guide 64 has a stem portion 65 and an enlarged head 66 at its lower end which engages the upper edge of the poppet valve stem 56 which extends beyond the sleeve 57 into the bore of housing 45, which portion of the bore forms a spring chamber 67 and against which head 66 the spring 63 rests. A spring guide bushing 68 extends over the upper portion of the stem 65 and is provided with a flange 69 to form an abutment against which the other end of the spring 63 presses.

The valve unit assembly 21 so far described is held in place in the bore 12 of the body 11 by means of an assembly nut 70 which is provided with an internally threaded bore 71 at its lower end and an intermediate smaller bore 72 providing a radial shoulder 73 therebetween. A still smaller bore 74 with internal threads is provided at the upper end of the said nut. The nut threadedly engages the threads 23 of the sleeve 22 to clamp the flange 49 between the upper end of the sleeve 22 and the shoulder 73. The nut is externally threaded as at 75 to engage the threads 17 of the body 11 and urge the unit 21 to clamp the flange 29 of the main valve seat member 28 against the stop shoulder 15. A flange 76 on the nut 70 is received in bore 18 and an O ring packing 77 received in a groove in the flange 76 engages the wall of the bore to seal this outer end of the assembly 21 against leakage from the space 35. A lock cap 78 having a recess 79 opening in the upper side thereof threadedly engages the upper portion of the said nut 70 and abuts against the upper edge of the body 11.

In the valve structure so far described, the poppet and main valve members are slidably mounted sufficiently loosely so as to be reasonably free of friction and thus very sensitive to such fluid under pressure as may act thereon. Consequently, there will be leakage from the chamber 62 between valve 37 and the guide 40 into the portion of bore 26 about valve seat 33. There will also be a leakage from the chamber 62 between the enlarged head 38 and the bore 25 or spring chamber 35, which is connected by means of radial openings 80 to the space 35. There will also be a leakage of fluid from the chamber 58 between the stem 56 of the valve 44 and the bushing 57 into the upper portion of the housing 45 which has radial openings 81 to the chamber 35. Consequently, the poppet valve 44 will be subjected on the downstream side thereof to pressure from the return port 20.

The spring 63 applies a constant pressure in a direction to oppose unseating of said valve 44 and predetermines the relief pressure at which the main valve will open. Upon pressure in port 16 increasing beyond that predetermined by the opposing force of the spring 63, which by way of example may be one thousand pounds pressure at port 16, the spring 63 will yield and the poppet valve will be unseated and fluid from port 16 will flow past poppet valve seat into chamber 58 and from this chamber through openings 60, recess 59, openings 61 into chamber 62. The head 38 of the main valve forming one wall of chamber 62 will then be subjected to pressure of the fluid at port 16 and will be moved by said pressure to open position against the opposing pressure of spring 43, and the pressure will be relieved by flow past main valve seat 33 and through openings 34, annular space 35, and thence to return port 20.

Upon a predetermined lowering of pressure at port 16 and similarly in chamber 62, the valve 44 under urge of spring 63 will return to seated position. The seating of valve 44 will trap the fluid under pressure in chamber 62 under which pressure said main valve is being held unseated. The fluid in chamber 62 will as previously described leak or vent out of said chamber 62. The venting of said fluid may be controlled by a choice of diameters between the sliding parts of the valve; thus there may be provided for quick or slow venting of said chamber as condition may require. When the pressure in chamber 62 has been reduced to that amount predetermined by the spring 43 whose value is constant, the main valve 38 under urge of said spring 43 will be returned to closed position.

In accordance with the invention, it is desired that relief pressure shall be controlled by an added or a sensed pressure. This sensed pressure is supplied by fluid under pressure, which fluid may be independent of or different from the fluid controlled by the valve, and the term "sensed pressure" is so used in this specification. In the instant disclosure the relief pressure is to be increased by adding a multiple of the sensed pressure. To this end the sensed pressure is transmitted to be applied to the poppet valve 44 by means of a piston 90 reciprocally mounted in a cylinder 91 and sealed against leakage thereby by an O ring packing 92. The cylinder is formed by an adaptor or member 93 having a bore 94 therethrough in which the piston 90 reciprocates. The upper end portion of the bore 94 is enlarged forming a recess 95 in which is received a closure 96 having a central opening 97 therethrough. A spring lock ring 98 is received in an annular groove in the side wall of the recess to retain said closure 96 in place. The member 93 may be threaded as at 99 to receive a connector (not shown) extending to a supply source of sensed pressure to be applied to the upper side of the piston 90 through the opening 97. The lower or shank portion of member 93 is externally threaded to be received in the threaded bore portion 74 of the assembly nut 70 and is locked in position by a lock nut and lock washer 100, 101, respectively. A guide member or poppet spring retainer 102 is received in the bore portion 72 of the nut in abutting relation with the flange 49 of the housing 45 and has an upper reduced portion 103 forming a stop shoulder 104. The reduced portion is frictionally received in the lower portion of the bore 94 and the lower edge of member 93 engages said shoulder 104 to retain said member 102 in secure position.

A bore 105 extends through the retainer 102 and is enlarged as at 106 and further enlarged as at 107 to form a stop shoulder 108 between the two diameter bores. The flange 69 of bushing 68 is received in the bore 107 and abuts against the shoulder 108 and is there retained by the pressure of spring 63. The pressure of spring 63 may be varied or adjusted by turning member 93 in the proper direction. A rod or plunger 109 having a diameter equal to that of the seat of valve 55 extends through the bore 105 and into engagement with the end of the stem 65. Leakage past the plunger 109 is sealed by an O ring packing 110. Leakage past the outer wall of the retainer 102 is also sealed by an O ring packing 111 received in an annular groove in said retainer.

A compression spring 113 is positioned between the upper end of the piston and the closure 97 which functions to urge said piston into engagement with the plunger 109. The bore 94 on the valve plunger side of the piston 90 is vented to recess 79 such as by means of a longitudinal slot 114 in the outer side of the shank of member 93 and nut 100 connected by means of a radial opening 115 to said lower portion of the bore 94. The pressure of spring 113 is transmitted on to the plunger 109 to hold the same in engagement with the stem 65 of the spring guide 64. The plunger 109 is sealed by a packing 110 and is there made of a diameter equal to the diameter of the seat of the poppet valve 44 and therefore equal thereto in area. Thus the poppet valve 44 will be balanced to back pressure reflected within the poppet valve housing 45 to any value less than the loading pressure of spring 113, because said pressure provides for the stem 65 and plunger 109 to be in effect as if made integral with each other. However, should the said back pressure become greater than the opposing value of the spring 113, the pressure in the space between the plunger 109 and stem 65 will act on the said plunger 109 to cause the spring 113 to yield and for the plunger and stem to be separate to place the valve 44 in an unbalanced condition to back port pressure which will now act upon said valve 44 in a direction to increase relief pressure. Thus by a choice of spring 113 loading we are able to provide for the poppet valve 44 to be balanced for any value of back pressure acting thereon and to any intermediae value of back pressure between zero back pressure and back pressure equal to relief pressure.

In Figure 2 there is shown a modification of spring guide stem 65' which is extended in continuation thereof to provide a plunger portion 109' integral with the stem 65'. The plunger is sealed by a similar packing 110 and is there made of a diameter equal to the diameter of the seat of valve 44. This construction of spring guide provides for a balance valve 44 to any back pressure acting thereon regardless of the spring 113 loading pressure on piston 90.

The modification shown in Figure 3 is substantially identical with that shown in Figure 1, but the spring 43 is omitted and the opposing force to the pressure from port 32 on valve 44 is furnished by means of a spring 113' bearing on piston 90'. The stem 65 and plunger 109 remain as in Figure 1 but provide for the valve 44 to be balanced for all values of back pressures as in the showing of Figure 2.

In the operation of the valve, the cylinder 91 will be connected by connections not shown to a suitable source of sensed pressure for controlling the relief pressure. This sensed pressure will add an increasing opposing value to that initially predetermined for relief. If the diameter of piston 90 be made the same as that of the diameter of the seat of valve 55, then relief pressure is increased by the amount of sensed pressure directed to the top of piston 90. By way of example, if the sensed pressure is 100 pounds and the valve is initially arranged to be open at a predetermined relief pressure of 1,000 pounds and the piston area exposed to sensed pressure is made equal to the area of the seat of valve 55, then the valve 44 will be unseated at a pressure of 1,100 pounds.

If the said area of the piston 90 is made larger or smaller than the area of the seat of the valve 55, then the relief pressure increases by the same proportion that the area of the said piston 90 bears to the area of the seat of valve 55. For example, if the area of the valve seat be made one square inch and the area of the piston 90 be made two square inches, then a sensed pressure of 100 pounds applied to piston 90 will increase relief pressure by 200 pounds, twice the amount of the sensed pressure. If sensed pressure is 200 pounds, then relief pressure will be increased by 400 pounds. If the area of the piston 90 is made one half that of the area of the valve seat, then a sensed pressure of 100 pounds applied to the piston 90 will increase relief pressure by one half the amount of sensed pressure or fifty pounds. If the area of the piston 90 is made four times that of the area of the seat of valve 44, a sensed pressure of 100 pounds per square inch applied to the piston 90 will increase relief pressure by four times the sensed pressure or 400 pounds. It will now be seen that the sensed pressure applied to the piston 90 will increase the relief pressure by a multiple of the sensed pressure in the same proportion that the area of said piston 90 bears to the area of the seat of valve 44.

In order to maintain a reasonable accuracy of valve operation, the chamber 79 may be connected to some reference point which may be a sufficiently large sealed chamber (not shown) wherein the pressure may be maintained constant so that pressure beneath the piston 90 may be reasonably constant so that such pressure reflected within the valve will be negligible and readily compensated for.

We claim:

1. In a relief valve, a pressure port, a return port, a main valve responsive to pressure from said pressure port for passing fluid from said pressure port to said return port, a pilot valve responsive to pressure from said pressure port and positioned in a passage connecting the pressure port and the surface of the main valve on which pressure acts to open said main valve for controlling the opening of said main valve, a housing for said pilot valve, a valve seat in said housing for said pilot valve, yieldable means within said housing for applying a predetermined opposing force on said pilot valve to the opening thereof by pressure from said pressure port, said pilot valve being subjected to return port pressure, means within said housing including a plunger for presenting opposite balance pressure areas on said pilot valve to said return port pressure, a reciprocal piston, means for biasing said piston into engagement with said plunger, and means for applying an additional force on said piston for applying an additional force on said pilot valve to oppose the opening thereof to increase the relief pressure at which said main valve will open, said biasing means holding said plunger and pilot valve into engagement with each other to maintain said pressure areas in balanced condition.

2. In a relief valve, a pressure port, a return port, a main valve responsive to pressure from said pressure port for passing fluid from said pressure port to said return port, a pilot valve responsive to pressure from said pressure port and positioned in a passage connecting the pressure port and the surface of the main valve on which pressure acts to open said main valve for controlling the opening of said main valve, a valve seat in said passage for said pilot valve, said pilot valve on one side of said seat being exposed to pressure from said pressure port tending to unseat said pilot valve and on the other side of said seat to pressure from said return port tending to oppose unseating of said pilot valve, means on the said other side of said seat for presenting opposite balanced pressure areas on said pilot valve to said return port pressure, yieldable means for applying a predetermined opposing force on said pilot valve to the unseating thereof by pressure from said pressure port, and a piston connected to said pilot valve and responsive to a sensed pressure thereon for applying an additional opposing force to the opening of said pilot valve for increasing the relief pressure at said pressure port in response to said sensed pressure.

3. In a relief valve, a pressure port, a return port, a main valve responsive to pressure from said pressure port for passing fluid from said pressure port to said return port, a pilot valve responsive to pressure from said pressure port and positioned in a passage connecting the pressure port and the surface of the main valve on which pressure acts to open said main valve for controlling the opening of said main valve, yieldable means for applying an opposing force on said pilot valve to the opening thereof by pressure from said pressure port, said pilot valve being exposed to return port pressure, and means connected to the low pressure side of said pilot valve for applying a force on said pilot valve in addition to said yieldable means to oppose the opening thereof to increase the relief pressure at which said main valve will open.

4. In a relief valve, a pressure port, a return port, a main valve responsive to pressure from said pressure port for passing fluid from said pressure port to said return port, a pilot valve responsive to pressure from said pressure port and positioned in a passage connecting the pressure port and the surface of the main valve on which pressure acts to open said main valve for controlling the opening of said main valve, yieldable means for applying an opposing force on said pilot valve to the opening thereof by pressure from said pressure port, said pilot valve having opposite balanced pressure areas exposed to return port pressure, a piston mounted for reciprocation and operatively connected to said pilot valve, and means for connecting said piston to a pressure source which is independent of the pressures of said ports for applying a force on said piston to additionally oppose the opening of said pilot valve to increase the relief pressure at which said main valve will open.

5. In a relief valve, a pressure port, a return port, a main valve responsive to pressure from said pressure port for passing fluid from said pressure port to said return port, a pilot valve responsive to pressure from said pressure port and positioned in a passage connecting the pressure port and the surface of the main valve on which pressure acts to open said main valve for controlling the opening of said main valve, yieldable means for applying an opposing force on said pilot valve to the opening thereof by pressure from said pressure port, a pressure piston connected to said pilot valve, means for applying a force on one side of said piston for applying an additional force on said pilot valve to oppose opening thereof by pressure from said pressure port, and a conduit to the other side of said piston for applying pressure thereon of substantially constant value.

6. In a relief valve, a pressure port, a return port, a main valve responsive to pressure from said pressure port for passing fluid from said pressure port to said return port, a pilot valve responsive to pressure from said pressure port and positioned in a passage connecting the pressure port and the surface of the main valve on which pressure acts to open said main valve for controlling the opening of said main valve, a valve seat in said passage for said pilot valve, spring means for biasing said pilot valve on said seat and for opposing the opening of said pilot valve, said pilot valve being exposed to return port pressure, means including a plunger connected to said pilot valve for presenting opposite balanced pressure areas on said pilot valve to said return port pressure, a piston, means for biasing said piston into engagement with said plunger, and means for applying an additonal pressure on said piston for applying an additional force on said pilot valve to oppose the opening thereof to increase the relief pressure at which said main valve will open, said biasing means holding said plunger and pilot valve in engagement with each other to maintain said pressure areas in balanced condition.

References Cited in the file of this patent
UNITED STATES PATENTS

| | | |
|---|---|---|
| 781,913 | Schutte | Feb. 7, 1905 |
| 2,398,811 | Stacy | Apr. 23, 1946 |
| 2,520,893 | Stevenson | Aug. 29, 1950 |
| 2,523,826 | Heinzelman | Sept. 26, 1950 |
| 2,574,262 | Heck | Nov. 6, 1951 |
| 2,587,161 | Huber | Feb. 26, 1952 |
| 2,601,870 | Lee | July 1, 1952 |